Nov. 5, 1940.   B. G. PLUMMER   2,220,120
UNIVERSAL JOINT FOR TUBING
Filed Feb. 17, 1938
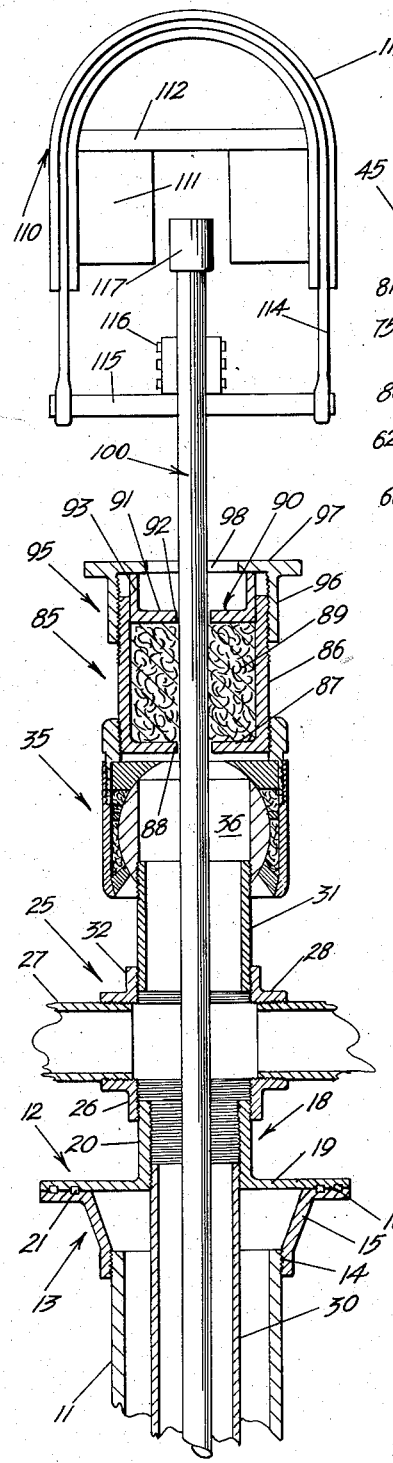
Inventor
BENJAMIN G. PLUMMER
By Hazard and Miller
Attorneys Patented Nov. 5, 1940

2,220,120

UNITED STATES PATENT OFFICE 2,220,120

UNIVERSAL JOINT FOR TUBING

Benjamin G. Plummer, Huntington Beach, Calif.

Application February 17, 1938, Serial No. 191,020

5 Claims. (Cl. 285—95)

My invention relates to a universal joint suitable for the stuffing box assembly through which the polished rod of a well pump operates. This type of universal joint may also be applied to form a tubular coupling.

In the operation of deep well pumps such as those used in oil pumping, it is quite common practice to provide a string of sucker rods operating the pump. The upper rod is connected to the polished rod which operates through a stuffing box. Such stuffing box in the usual construction, is connected to a fixed structure such as the upper end of the oil tubing through which the oil is pumped upwardly or from structure connected thereto, the oil being carried off below the stuffing box. In this type of construction the polished rod may be reciprocated by many different types of appliances, a common equipment being a walking beam with what is termed a horsehead on the outer end thereof. A sling or the like engaging the horsehead carries a clamp for the polished rod. Although this horsehead and the operation of the walking beam is intended to give a true vertical reciprocation to the polished rod, this true action very rarely occurs and there is always a certain amount of side movement or sway to the polished rod above the stuffing box. In addition, the sucker rods also develop a side movement or swinging action in the oil tubing and this causes some lateral movement to the lower end of the polished rod. This movement above and below the stuffing box loosens the packing and also increases the friction of the operation of the polished rod. A main object therefore, of my invention is to overcome these difficulties and mount the stuffing box so that it may sway or wobble with the lateral movement of the sucker rod during its reciprocating motion.

A further object and characteristic of my invention in relation to the stuffing box in combination with a universal joint support for such stuffing box through which the polished rod operates resides in a construction by which when disconnecting the polished rod from the walking beam or other reciprocating device to operate such rod, the complete weight of the rod and the various appliances suspended thereby in a deep well is primarily supported by the box construction of the stuffing box and secondly the weight is transmitted from the stuffing box assembly to the upper spherical bearing of a ball and socket type of universal joint in which the ball is mounted in a fixed position on an oil tube or the like. An additional feature of this construction is that the entire weight of the polished rod may be carried by the box construction of the stuffing box without increasing the compression of the packing in such box. This construction is also important as sometimes the clamps or equivalent connecting the polished rod to the reciprocating mechanism break and allow a sudden drop of the polished rods striking a blow on the stuffing box assembly with terrific momentum.

A main object therefore, of my invention is to provide a universal joint of the ball and socket type of mounting for the stuffing box. The ball of the joint is preferably firmly connected to an extension of the oil tubing or an equivalent tubular structure above the lead lines for carrying off the oil. A housing or coupling structure is mounted for universal rotation on the ball having suitable bearings and packing, then the stuffing box is firmly connected to the coupling. The polished rod thus operates through the stuffing box. The universal joint including the coupling and the ball, the extension of the oil tubing past the lateral lead lines for the oil and connects the oil tubing to the line or string of sucker rods. Thus, any lateral or wobbling motion of the sucker rod at the same time causes a similar movement to the stuffing box and the coupling, these being freely rotatable on the ball.

A more specific object and characteristic of my invention as it applies to the universal joint as a whole, is that the coupling member employs a sleeve with a cylindrical inside surface with a conical taper at its outer end. An outer bearing has complementary conical outer surfaces engaging with the sleeve and shaped to form a spherical bearing with the ball. An inner bearing fits against a thrust shoulder and is cylindrical on its periphery engaging a complementary part of the sleeve. The inner bearing is also shaped to have a spherical bearing with the ball, and thus the desired fitting and pressure may be developed between the outer and inner bearings and the ball.

A further characteristic of the joint is in the employment of an intermediate bearing ring cylindrical on its periphery to fit the cylindrical surface of the sleeve and also spherically ground to engage the ball inwardly from a diametrical line. This construction, therefore, provides three distinct bearings engaging the ball and there is lubrication packing and leak-preventing packing between the two outer and central bearing and the ball.

My invention is illustrated in the accompanying drawing in which:

Figure 1 shows a vertical section through the upper part of an oil well, the polished rod being shown in elevation and also illustrating a conventional construction of horsehead mounted on a walking beam or the equivalent;

Fig. 2 is an enlarged view of the universal joint of Fig. 1, omitting the polished rod and the stuffing box; and Fig. 3 is a longitudinal section of a double ball type of universal joint tubular coupling or connector.

Dealing first with the construction of Fig. 1, a well casing is indicated by the numeral 11 upon which is mounted a conventional tubing head 12 having the lower connector portion 13 connected to the casing by screwthreads 14. This, in common practice, has a flared section 15 and a flange 16. The upper half 18 of the tubing head has a horizontal flange 19 and a coupling tube 20. The flanges are bolted together and have intermediate packing 21 to prevent leakage. A cross or four-way connector 25 has its lower end 26 connected to the coupling tube 20 and oil lead lines 27 take off laterally from the opposite side 28. These have the usual controls for the flow of oil. The oil tubing 30 is shown as screwthreaded to the upper half of the tubing head and thus extends downwardly into the well, the string of oil tubing being connected in the usual manner. An upper oil tubing or oil sub 31 extends upwardly from the upper end 32 of the cross or four-way connector 25.

The ball and socket assembly 35 as shown, particularly in the detail of Fig. 2, employs the tubular ball 36. This ball has the spherical bearing surface 37 and a central bore 38, the lower end of the bore being connected to the sub 31 by screwthreaded connection 39. This holds the ball in firm relation and position on the sub and hence in relation to the other fixed parts of the well assembly. The ball is shown as terminating at the transverse end 40. The socket assembly structure 45 employs a sleeve 46 which has a cylindrical inside surface 47 and a conical contraction 48 terminating at the open lower end 49. This cone section is carefully made, its axis being truly in line with the axis of the cylinder 47. A pressure collar assembly 50 has a ring-like end 51 with a shoulder 52. An exteriorly threaded tubular pin 53 engages the internally threaded box end 54 of the sleeve 46. The inside cylindrical surface 55 of the collar is of the same diameter and in true alinement with the cylinder 47 of the sleeve.

An outer bearing 60 is formed in the manner of a ring and has an outside cone surface 61 to engage the internal cone 48 of the sleeve, the inner surface 62 is spherical and conforming to the curvature of the ball. The lower surface 63 has a decided bevel from the ball to the surface 61 to accommodate extreme tilts or turning of the socket assembly on the ball. The upper surface 64 preferably has a steep upward slope so that the bearing 62 is carried well inwardly in the socket structure above the conical surface 48 of the sleeve.

An inner bearing 70 has a cylindrical outer surface 71 engaging the cylindrical surface 55 of the collar 50. The upper surface or end 72 is at right angles to the axis of the sleeve and collar assembly to be engaged by the shoulder 52 of the enlarged part 51 of the collar. The spherical surface 73 conforms to the complementary surface of the ball and extends a sufficient distance beyond the end 40 when the coupling assembly is in alinement to accommodate the angular motion.

An intermediate bearing 75 has a cylindrical periphery 76 engaging the cylinder 47 of the sleeve. This preferably has parallel upper and lower surfaces 77 and 78, the inside surface 79 being spherical to conform to the sphere of the ball. Between these several bearings there is an outer compressible packing 80 between the bearing 60 and intermediate bearing 75 and a second packing 81 between the bearing 75 and the inner bearing 70. It will be seen by this construction that threading the collar 51 inwardly exerts a pressure between the shoulder 52 of the collar and the end surface 72 of the inner bearing and thus adjust the ball in proper relation to the bearings. Manifestly, the outer conical bearing 60 may be inserted before the assembly.

The stuffing box assembly designated by the numeral 85 includes a cylindrical box structure 86 threaded in the collar 50. This has a bottom 87 with a perforation 88. A packing 89 is retained in place by a thrust gland 90 which is shown as having a disc-like base 91 with a perforation 92 and a cylindrical flange 93. A gland nut 95 has a sleeve 96 threaded on the outside of the cylindrical box 86. This mounts a pressure plate 97 having a large opening 98. The polished rod designated by the numeral 100 extends through these openings or perforations in the stuffing box, the packing engaging such rod and the whole assembly being movable with the socket structure 45.

The operating assembly 110 for the polished rod may be of any suitable type as a conventional structure. In the form shown the ends of the walking beam designated by the numeral 111 having a cross-bar 112 from which is supported a curved horsehead 113. A sling 114 engages the face of the horsehead to which the upper end is secured and at the end of the sling there is a supporting beam 115 having the polished rod clamp 116 connected thereto. This has the usual soft face for clamping the rod. A coupling sleeve 117 is illustrated as on the upper end of the rod.

The manner of operation and functioning of this type of polished rod assembly is as follows: It will be understood that the structure up to and including the oil sub 31 and the ball is held substantially rigid and stationary. The polished rod at its lower end is connected to a string of sucker rods which string has more or less lateral movement in the oil tube 30. While the walking beam and horsehead or other equipment is reciprocating a polished rod is intended to have this rod operate in a truly vertical line nevertheless this desirable result is hardly ever realized. There is practically always a wobbling motion at the upper end of the polished rod. As the stuffing box is free to move in this wobbling motion on account of being mounted with universal joint connection to the ball, this slight lateral movement may be accommodated and the rod reciprocate through the packing without producing excess wear or compressing the packing laterally to such an extent that a leakage would occur of the oil filling in the ball and cut off by the stuffing box assembly.

In Fig. 3 I show an application of my invention to a double universal joint. In this the connector designated by the numeral 120 includes two similar sleeves 121, each having a cylindrical inside surface 122, a conical internal beveled end 123, an enlarged threaded recess 124 and terminating at 125. A central collar 130 has an inside abutment ring 131 with opposite transverse faces 132. The outer part has a projecting ring section 133. From each side of the collar there are projecting pin sections 134 externally threaded to engage the internal threads of the recess 124. These pins have a cylindrical inside surface 135. The balls 140 are shown as similar having a tube 141 connected thereto and each ball having a flared duct 142 on the inside terminating at 143. The outside surface 144 is spherical from the tube 141 to the flared duct 142. Each ball is fitted in place and supported for rotation by an outer bearing ring 150, an inner ring 151 and an intermediate ring 152, there being compressible packing 153 between the outer and intermediate rings and similar packing 154 between the intermediate and the inner ring 151. These rings are substantially the same as described in connection with Figs. 1 and 2. In this construction the balls and the bearing rings are assembled each in its sleeve prior to connecting the collar 130. As the rings are threaded on the pins of the collar, the inside abutment ring 131 exerts a thrust on the inside bearing rings 151 bringing these into firm and proper engagement with the ball contiguous thereto and thereby causing a proper seating of the ball on the outer and the intermediate bearing rings, this action also compressing the packing. It will be noted that in this construction there is normally a space between the ends of the pins of the collar and the threaded recesses of the sleeves and also an outside space between the ends of the sleeve and the outer ring portion 133 of the collar. This allows considerable tightening of the pair of sleeves on the collar to take up any wear on the balls and the bearing rings before it would be possible for the ends of the sleeve and the ends of the pin portion of the collar to jam together. It will be seen that on account of the decided bevel of the outer surface of the outer rings that a considerable angularity of turn may be given to each ball in its socket structure formed of the sleeve, the bearing rings and the packing.

In all of the constructions of the universal joint the inner bearing ring is located on one side of a diametrical center through the ball and on the side towards the inner bearing ring. The packing between the outer and the intermediate bearing ring is mainly for lubrication and the packing between the intermediate and the inner bearing ring is mainly a compression packing, this transmitting compression stresses to the intermediate ring and bringing this into a bearing contact with the ball. Hence as the intermediate ring becomes worn, it is forced outwardly closer to the diametrical plane through the ball.

An important characteristic of my invention with the polished rod and stuffing box assembly relates to the support of this polished rod on the stuffing box when it is disconnected from the walking beam or other device for reciprocating such rod. In such case the whole weight of the sucker rods is taken by the polished rod and this may be supported by means of a clamp or the like on the stuffing box. All of the weight is thus carried by the collar 50 and this transmits the pressure to the inner bearing ring 70 and hence by such ring to the ball. There is no downward thrust or weight then carried by the intermediate bearing ring 75 or the lower bearing ring 60.

An important feature of my assembly, particularly relating to the stuffing box construction is that the thrust gland 90 is forced downwardly in the box structure 86 by the gland nut 95 which has a pressure plate 97 engaging the cylindrical flange 93 of the thrust gland. Therefore, by means of a clamp or suitable device the entire weight of the polished rod 100 and of the appliances suspended thereby may be first carried directly by the pressure plate 97, then transmitted through the threaded connection to the box 86 and this action does not change or increase the compression of the packing 89 in the stuffing box. The entire weight therefore is then transmitted by the stuffing box through its threaded connection with the rigid ring 51 of the pressure collar 50 and thus reacts on the ball and socket universal joint assembly 35.

Various changes may be made in the details of the construction without departing from the spirit or scope of the invention as defined by the appended claims.

I claim:

1. In a device as described, a universal joint including a sphere having an opening therethrough with a tubular supporting means at one end of the opening connected to the sphere, a socket assembly including a sleeve and a collar screw threaded together, there being an inside cylindrical surface, the sleeve at its outer end having a converging conical surface, an outer ring bearing having an outer surface complementary to the cone of the sleeve and having an inner spherical surface, an inner bearing ring having a peripheral cylindrical surface, an end surface transverse to the axis of such ring, the collar having a thrust shoulder to engage such latter surface and packing between the two rings and engaging the outside of the sphere, the shoulder of the said collar being adapted to seat the inner ring against the sphere and thereby force the sphere into engagement with the outer bearing ring.

2. In a device as described, a universal joint including a sphere having an opening therethrough, a tubular supporting structure connected to the sphere at one end of the opening, a socket assembly including a bearing sleeve, a collar, said collar having a threaded pin, the sleeve having a threaded recess engaging the threads of the pin, the sleeve and the said pin having cylindrical surfaces of the same diameter, the sleeve at the end remote from the collar having a coned surface with the large diameter forming a joint with the cylindrical surface of the sleeve, the said collar having an abutment ring on the inside with abutment shoulders transverse to the axis of the sleeve and the ring, an outer ring bearing having a peripheral cone surface to engage the conical surface of the sleeve and an inner spherical surface, an inner bearing ring having a cylindrical periphery to fit the cylinder of the said pin having a transverse surface to engage the shoulder of the abutment ring, the said collar when threaded into the sleeve forcing the inner bearing ring against the sphere and adjusting the sphere into operating contact with the outer bearing ring.

3. In a device as described and claimed in claim 2, an intermediate bearing ring having a peripheral cylindrical surface engaging the cylinder of the sleeve having an inner spherical surface to engage the sphere offset from a diametrical plane and packing between the outer and the intermediate ring and the intermediate and the inner ring.

4. In a device as described a cylinder including a sphere having an opening therethrough with a tubular supporting means at one end of the opening connected to the sphere combined with a socket assembly including a sleeve cylindrical as to the major portion of its inside surface but having a converging conical inside taper at its outer end, a thrust collar having a screw threaded connection to the sleeve and with an abutment shoulder, said collar having a portion extending into the sleeve of the same internal diameter and cylindrical, an inner bearing engaged by the thrust collar by an abutment shoulder thereon cylindrical on its outside surface and engaging the inside cylinder of the thrust collar, an outer bearing having a peripheral taper and engaging the inside taper of the sleeve, an intermediate bearing having a cylindrical periphery and slidable longitudinally of the sleeve, all of said bearings having a spherical surface engaging the sphere, the inner and intermediate bearings being always located inside of a diametrical plane through the ball and transverse to the sleeve and the outer bearings being always on the opposite side of such plane, a compression packing between the inner and intermediate bearings and a lubrication packing between the intermediate and the outer bearings.

5. In a device as described, a universal joint including a sphere having an opening therethrough with a tubular supporting member at the outer end of the opening connected to the sphere combined with a socket assembly including a sleeve, a thrust collar threaded to the inner portion of the sleeve for adjustment of the collar lengthwise of such sleeve, an inner bearing engaged by the thrust collar for longitudinal movement and engaging the ball, an outer bearing mounted in the sleeve in a fixed position and engaging an outer portion of the ball, an intermediate bearing engaging the ball and slidable in the sleeve, such intermediate and inner bearing being on the inside of the diametrical plane through the center of the ball and transverse to the sleeve, a compression packing between the inner and intermediate bearing and a lubrication packing between the intermediate and the outer bearings, the adjustment of the collar in tightening the inner bearing against the ball developing a compression of the compression packing and thereby submitting an outward thrust to the intermediate bearing to force such intermediate bearing into contact with the ball inside of the said diametrical plane, the tightening adjustment of the inner bearing forcing the ball tightly against the said outer bearing, the center circle of contact of each of the bearings with the sphere forming planes always parallel one to the other.

BENJAMIN G. PLUMMER.